Oct. 21, 1924.  
D. F. GRAHAM  
1,512,020  
ROLLER BEARING  
Filed June 28, 1921
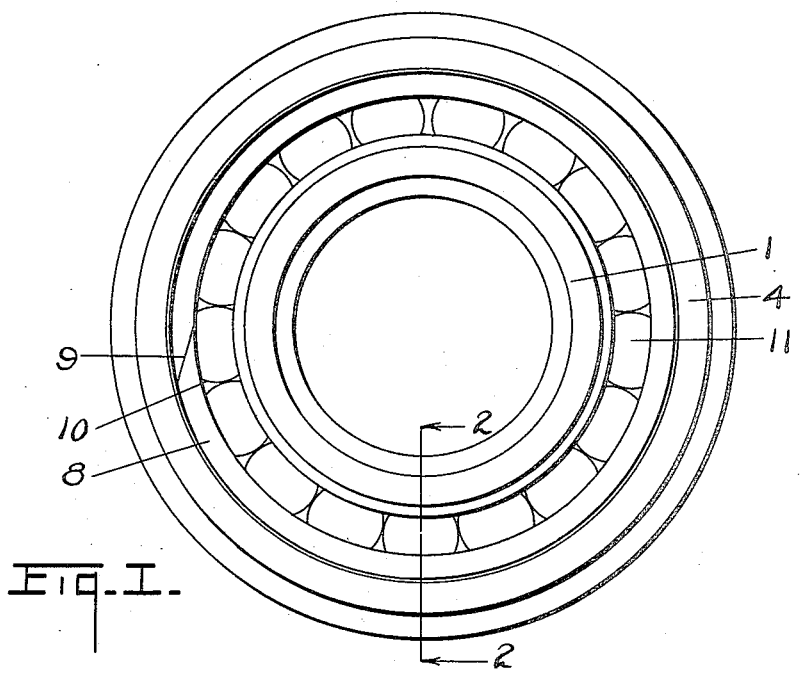
Fig. I.
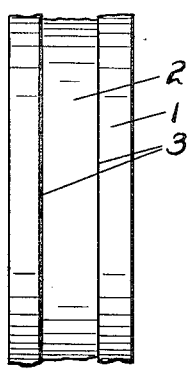
Fig. IV.
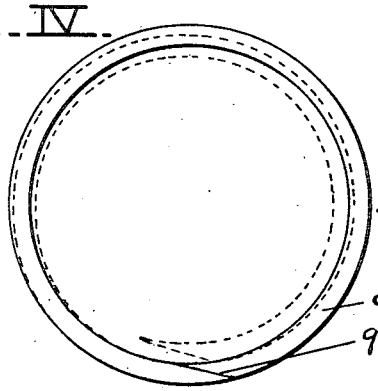
Fig. II.
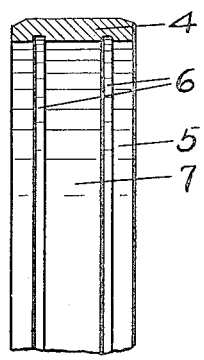
Fig. III.
Fig. V.
Inventor  
David F. Graham  
By Chappell & Earl  
Attorneys

UNITED STATES PATENT OFFICE.

DAVID F. GRAHAM, OF COUDERSPORT, PENNSYLVANIA.

ROLLER BEARING.

Application filed June 28, 1921. Serial No. 480,976.

*To all whom it may concern:*

Be it known that I, DAVID F. GRAHAM, a citizen of the United States, residing at Coudersport, county of Potter, State of Pennsylvania, have invented certain new and useful Improvements in Roller Bearings, of which the following is a specification.

This invention relates to improvements in roller bearings.

The main objects of this invention are to provide an improved roller bearing which ranks high in the matter of quality and durability and which is economical to produce, both in the matter of material and machine work required.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawings, forming a part of this application, in which:

Fig. I is an end elevation of my improved roller bearing.

Fig. II is a detail section through the bearing members on a line corresponding to line 2—2 of Fig. I.

Fig. III is an inside detail view of the outer bearing member.

Fig. IV is an outside detail view of the inner bearing member.

Fig. V is a side view of one of the retaining rings.

In the drawings, similar reference characters refer to similar parts throughout the several views.

Referring to the drawings, the inner annular bearing member 1 has a peripheral groove-like raceway 2, the ends of the raceway being in parallel planes providing thrust shoulders 3. By thus forming the raceway in the form of a groove or channel in the periphery of the inner bearing member it may be easily formed therein and ground. The outer bearing member 4 has a bore 5 of uniform diameter extending from end to end thereof with spaced annular grooves 6 cut therein, the portion between the grooves constituting the raceway 7. By thus forming the raceway in the outer member, it may be produced by a straight cut and also ground or finished by straight work. The grooves 6 may be readily milled and do not need to be finished.

I provide thrust rings 8 which are adapted to be sprung into the grooves 6, the thrust ring having pivoted ends 9 which overlap when the rings are in place, providing a continuous thrust bearing face for the ends of the rollers 10. The rollers 10 have flat ends disposed at right angles to their axes, these flat ends coacting with the thrust shoulder 3 of the inner bearing member and the inner sides or facing of the thrust rings.

The bevels of the rings are at quite acute angles, as illustrated, so that there is no direct break in the joint and also so that these pivoted ends may slide easily upon each other when the rings are sprung into or out of the grooves, this action being what I designate as an involute winding and unwinding movement. The springing of the rings holds these pivoted surfaces in close contact rather than tending to separate the ends as would be the case on short or abrupt bevels. This not only permits the engagement and disengagement of the rings without unduly springing them but the long joint caused by their overlapping insures a good bearing surface between the ends.

In the embodiments illustrated the outer bearing member is provided with two grooves, there being a thrust ring at each end. This is of advantage in manufacturing as a continuous finishing is possible, but it is sometimes desired to provide the outer member with an integral thrust shoulder at one end.

My improved bearings are very economical to produce, particularly in the matter of machine labor or machine work, which is quickly and easily performed, providing superior bearing surfaces.

Having thus described my invention, what I claim as new and desire to secure by Letters Patent, is:

1. A roller bearing comprising outer and inner bearing members, the inner bearing member having a peripheral raceway provided with thrust shoulders at each end, the outer bearing member having a bore extending from end to end with spaced annular grooves therein, the part between the grooves constituting a raceway, bearing rollers coacting with said raceway and having flat ends coacting with the thrust shoulders of the raceway of the inner bearing member, and flat split retaining rings sprung into said grooves and having beveled lapping ends providing continuous thrust members for said rollers, the angles of the beveled ends of said rings being such that the beveled ends overlap for a substantial distance and the overlapping bevel may slide longitudinally upon the underlapping bevel in introducing and removing the ring from the groove.

2. A roller bearing comprising outer and inner bearing members, the inner bearing member having a peripheral raceway provided with thrust shoulders at each end, the outer bearing member having a bore extending from end to end with spaced annular grooves therein, the part between the grooves constituting a raceway, bearing rollers coacting with said race way and having flat ends at right angles to their axes coacting with the thrust shoulders of the raceway of the inner bearing member, and flat split retaining rings sprung into said grooves and having beveled lapping ends providing continuous thrust members for said rollers, the inner faces of the rings being in planes parallel to the ends of the rollers.

3. A roller bearing comprising outer and inner bearing members, the inner bearing member having a peripheral race-way provided with thrust shoulders at each end, the outer bearing member being provided with a race-way having an annular groove at one end thereof, bearing rollers coacting with said race-way and having flat ends at right angles to their axes, and a flat split ring sprung into said groove said ring having beveled lapping ends providing a retaining and a continuous thrust member for said rollers, the angle of the bevels of said ring being such that the overlapping bevels slide freely as the ring is compressed and expanded with an involute wrapping and unwrapping movement.

In witness whereof, I have hereunto set my hand and seal in the presence of two witnesses.

DAVID F. GRAHAM. [L. S.]

Witnesses:
NORA H. GRAHAM,
ARTHUR B. MANN.